T. B. Bleecker,
Folding Bedstead,
No. 1,015. Reissued July 24, 1860.
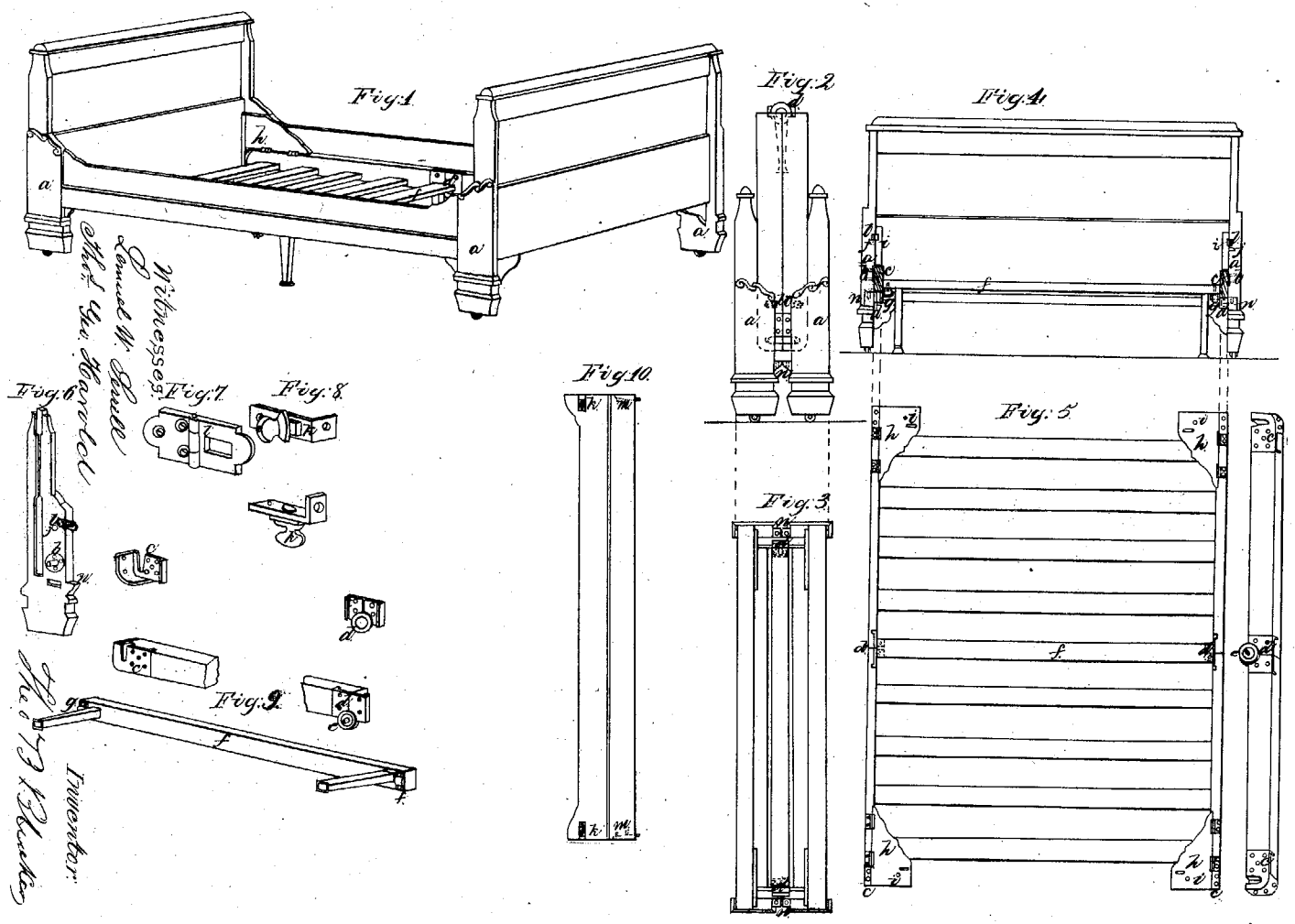
N. PETERS, PHOTO-LITHOGRAPHER, WASHINGTON, D. C.

UNITED STATES PATENT OFFICE.

T. B. BLEECKER, OF NEW YORK, N. Y.

IMPROVEMENT IN FOLDING BEDSTEADS.

Specification forming part of Letters Patent No. 5,072, dated April 17, 1847; Reissue No. 1,015, dated July 24, 1860.

*To all whom it may concern:*

Be it known that I, THEOPHYLACT B. BLEECKER, of the city of New York, in the county and State of New York, have invented a new and Improved Mode of Constructing Folding-Hinge Bedsteads; and I do hereby declare that the following is a full and exact description of the construction and operation of the same, reference being had to the annexed drawings, making a part of this specification, in which—

Figure 1 is a perspective view; Fig. 2, a front view (in folded position;) Fig. 3, a bird's-eye view (in folded position;) Fig. 4, a transverse section; Fig. 5, a bird's-eye view of the hinged frame; Fig. 6, a view of one of the pillars or posts; Figs. 7 and 8, fastenings for side panels to posts; Fig. 9, a supporting-frame; Fig. 10, a side panel.

Similar marks of reference denote the same parts.

I construct the two ends of the bedstead—head and foot—separately, each being formed of two pillars or posts, *a a*, connected by cross-pieces or panels. On the inside of the posts thus separately framed for the respective head and foot boards or guards two metal hinge-bolts, *b b*, are attached, on which the ends of the two side rails (see Fig. 5) of the hinged frame are hooked and rest, the metal end plates, *c c*, which are attached to each respective end of side rails, being formed in the shape of a hook. In this manner the ends of the side rails are allowed to turn on the bolts, and constitute a joint or hinge. The above-named side rails are connected with slats and have a hinge, *d d*, in the center, the hinge-bolt being on the under side of each rail, which forms a hinged frame and allows the center of the frame to be raised upward when the bedstead is folded, and when the frame is lowered or extended the joint of metal and timber above the hinge-bolt abut closely and the side rails are prevented from descending below the straight line.

To prevent the center hinge and frame being strained by weight, there are two pivots, *e e*, extended from the inner side of each center hinge, on which a supporting-frame, *f*, is hung by means of irons *g g*, the weight being supported by the two legs attached to the frame. When the bedstead is folded, said frame will maintain a hanging position on the pivots.

For the purpose of bracing the bedstead when extended or in an unfolded position, there are four braces, *h h h h*, attached with hinges near the ends of each side rail, each brace having a bolt or pin, *i i i i*, attached, which bolts are pressed into the bolt-holes *j j*, Figs. 4 and 6, in each post. Whenever the bedstead is to be folded, the braces are closed down to the frame.

To raise the sides of the bedstead, if required, a panel, Fig. 10, is fastened to each side by means of bolts *k k* and eye-hinges *l l* for the top fastenings, and the bolts *m m* and steps *n n* for the bottom fastenings. The bolts *m m*, at the bottom of the panel, first being inserted into holes in the brackets *n n*, near the bottom of the posts, the bolts *k k* are then passed through the eyes of the hinges *l l* and turned, which secures the panel to the posts.

Whenever the bedstead is to be folded, the center of the hinged frame should be raised, whereby the head and foot ends or guards are drawn together by means of the hook-shaped irons, fastened to each end of the rails of the said frame, these operating as a hinge on the bolts attached to the posts.

The above-described construction may be entirely of iron.

In moving double bedsteads it may be well to disconnect the hinged frame from the ends, which is readily done by lifting said frame off the hinge bolts. This, however, is not required to be done with single or lightly-constructed bedsteads.

I am aware that folding or sofa bedsteads have heretofore been made to fold sidewise, with hinges to connect the parts of the bottom; but the division in said bottom was longitudinally, instead of transversely, of said bedstead, and had no reference to the head and foot guards being brought together; therefore,

What I claim, and desire to secure by Letters Patent, is—

1. The employment of a frame hinged in the center and connected to the two ends of a bedstead for the purpose of folding the whole bedstead together endwise, in the manner described.

2. In combination with said folding frame, the hook shaped ends to the side rails taking bolts attached to the posts and forming hinges at these points for folding the hinged frame, or allowing said frame to be disconnected from the posts, as specified.

3. In combination with said frame hinged in the center, the pendent legs, Fig. 9, and the braces *k*, for the purposes and as specified.

In witness whereof I have hereunto set my signature this 8th day of June, 1860.

THEO. B. BLEECKER.

Witnesses:

LEMUEL W. SERRELL,
THOS. GEO. HAROLD.